No. 892,069. PATENTED JUNE 30, 1908.
J. S. MOORE & H. C. DECK.
INDESTRUCTIBLE FENCE POST.
APPLICATION FILED AUG. 5, 1907.
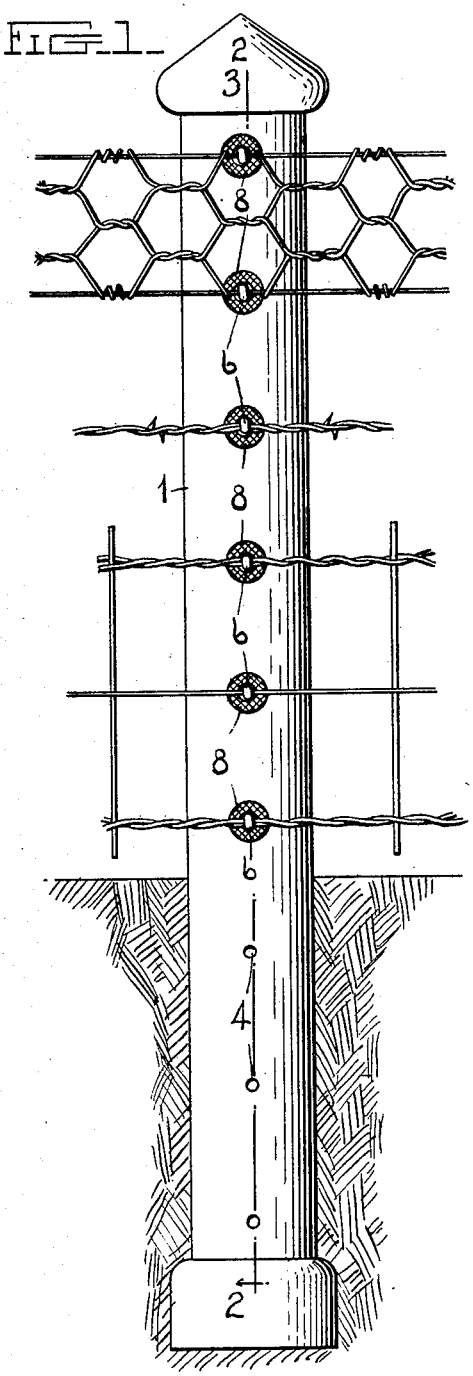
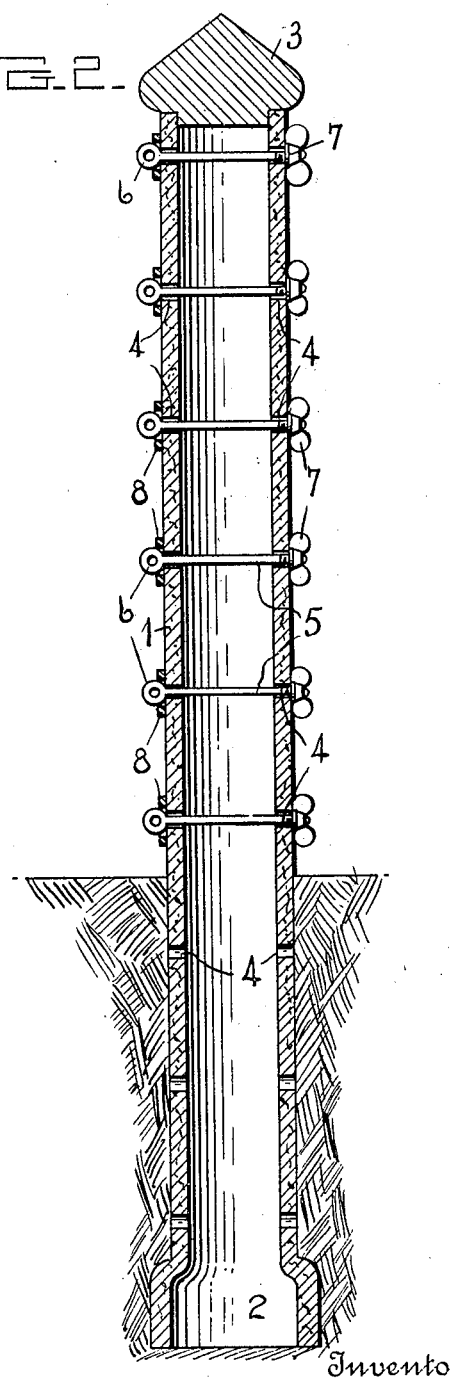
Witnesses
L. B. James
C. H. Griesbauer
Inventors
H. C. Deck &
J. S. Moore
by H. B. Wilson & Co.
Attorneys

UNITED STATES PATENT OFFICE.

JACOB S. MOORE AND HARRY C. DECK, OF ROODHOUSE, ILLINOIS, ASSIGNORS OF ONE-THIRD TO WILLIAM B. PARKER, OF KANE, ILLINOIS, ONE-THIRD TO ROY P. WOLFE, OF ROODHOUSE, ILLINOIS, AND ONE-THIRD TO SAID DECK.

INDESTRUCTIBLE FENCE-POST.

No. 892,069.        Specification of Letters Patent.        Patented June 30, 1908.

Application filed August 5, 1907. Serial No. 387,176.

To all whom it may concern:

Be it known that we, JACOB S. MOORE and HARRY C. DECK, citizens of the United States, residing at Roodhouse, in the county of Greene and State of Illinois, have invented certain new and useful Improvements in Indestructible Fence-Posts; and we do declare the following to be a full, clear, and exact description of the invention, such as will enable others skilled in the art to which it appertains to make and use the same.

This invention relates to an indestructible fence post.

The object of the invention is to provide a post which will be fire, water, vermin and decay-proof, and to which any desired form of fence may be attached.

In the accompanying drawings,—Figure 1 represents an enlarged front elevation of one of these improved posts showing a variety of forms of wire fence attached thereto; Fig. 2 represents a vertical section thereof taken on line 2—2 of Fig. 1.

In the drawing a hollow fence post 1 is shown composed of vitrified clay, glass or other siutable material having a glazed inner and outer face, which is impervious to moisture, vermin and the like, and which may be of any desired shape and size. This post 1 is preferably provided with a base flange 2 to serve as an anchor for preventing its withdrawal, and with an ornamental cap or top piece 3 of any desired shape and form. This post 1 is preferably provided throughout its length on diametrically opposite sides, with a plurality of vertically spaced apertures, as 4, those on one side registering with those on the other and adapted to receive fastening members, as 5. These members 5 are preferably made in the form of eye bolts having one end bent to form the loop or eye 6, which projects through the aperture at one side of the post to receive the wire of a fence, and with a winged nut 7 on its other end which projects through an aperture in the opposite side of the post, whereby the device may be tightened without the use of a wrench or other tool. Washers, as 8, are arranged on the looped end 6 of the bolts 5 between the wire of the fence and the post. These washers 8 are preferably made of insulating material and have their outer faces milled or barbed to hold the fence wire against slipping after it has been tightened and the openings therein are made sufficiently large to permit the eyes of the bolts to fit in said holes to bring the wires passing through the eyes in close proximity with the milled or barbed faces of the washers.

The bolts 5 are preferably made of or covered with an insulating material to render them non-conductors of electricity in the event of the post being used as a telegraph or telephone pole.

The apertures 4 are preferably arranged throughout the length of the post, those below the surface of the earth serving as vent holes to permit the water to pass in or out.

We claim as our invention:—

A hollow fence post, composed of vitrified clay and having two series of longitudinally arranged vertically spaced apertures in its diametrically opposite faces, the apertures in one series registering with those of the other, eye bolts extending through said registering apertures and adapted to form supports for fence wires, washers arranged on the eye-carrying ends of said bolts with openings therein made sufficiently larger than the bolts to permit the eyes thereof to fit into said openings to bring the wires into close proximity with the outer faces of said washers, said outer washer faces being barbed to hold the wires against slipping.

In testimony whereof we have hereunto set our hands in presence of two subscribing witnesses.

his
       JACOB S. X MOORE.
                mark
       HARRY C. DECK.

Witnesses:
     ROY P. WOLFE,
     CALVIN A. SPENCER.